Feb. 17, 1970 J. DONATELLI ET AL 3,495,406
LASER ENERGIZED POWER PLANTS
Filed May 4, 1967 2 Sheets-Sheet 1

INVENTORS:
JERRY DONATELLI
JOSEPH GRECO
By: *Jerry B. Besak*

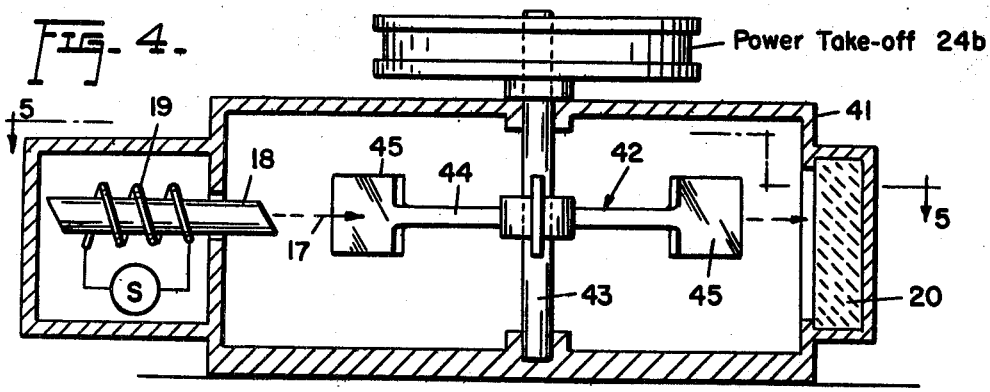
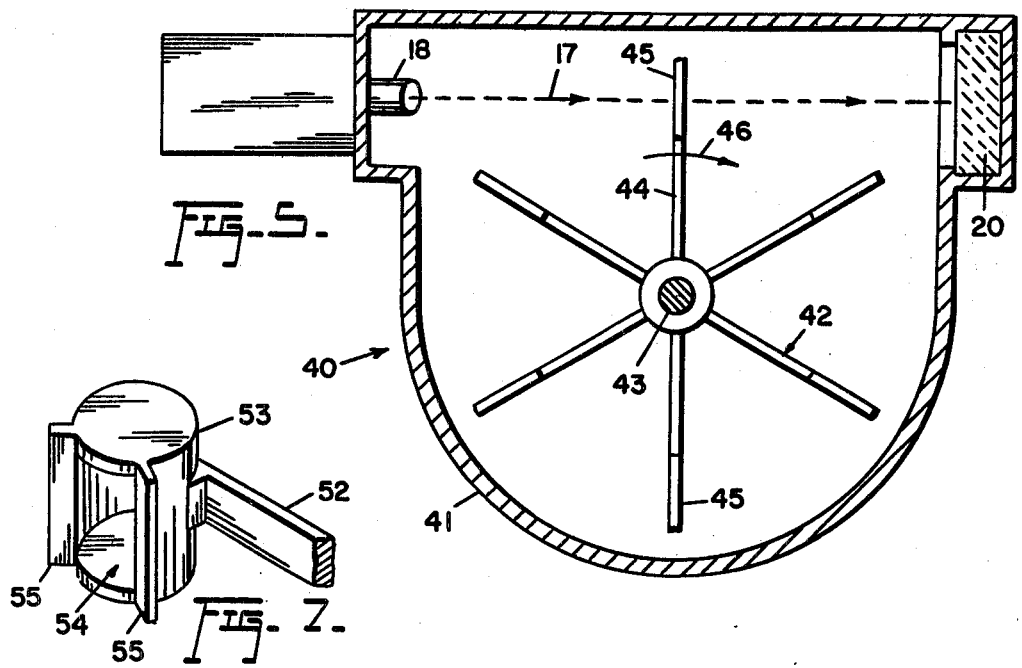
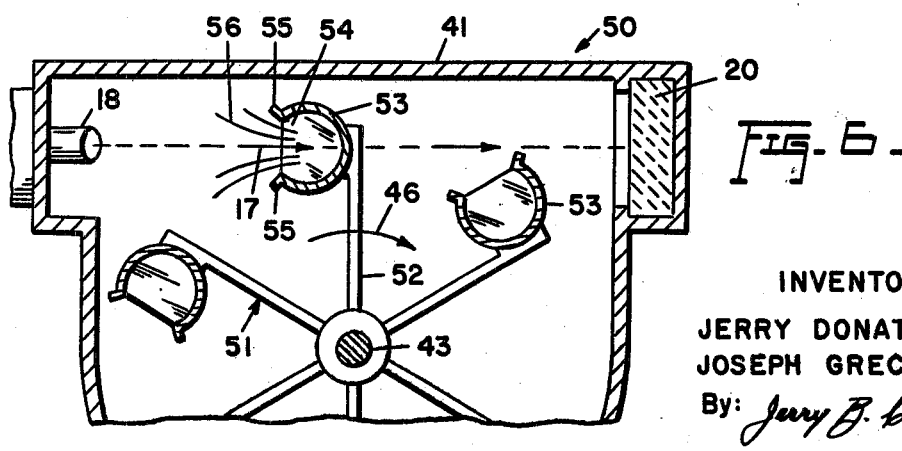

United States Patent Office

3,495,406
Patented Feb. 17, 1970

3,495,406
LASER ENERGIZED POWER PLANTS
Jerry Donatelli 224—40 67th Ave., Bayside, N.Y.
11364, and Joseph Greco, Floral Park, N.Y.
(86—29 259th St., New York, N.Y. 11001)
Filed May 4, 1967, Ser. No. 636,053
Int. Cl. F03g 7/02, 7/04; H01s 3/00
U.S. Cl. 60—108                                6 Claims

ABSTRACT OF THE DISCLOSURE

A transducer positioned in the path of a laser beam from a laser beam generator so as to transform laser beam energy into rotary motion. In one embodiment the transducer includes a boiler for converting liquid into pressurized vapor, and a rotary member with propulsion jets receiving pressurized vapor from the boiler. In another embodiment the transducer comprises a rotary member with vanes which are impelled by laser beam energy. In still another embodiment the rotary member of the transducer has gas pockets with jet-like outlets, so that gas heated in the pockets by the laser beam escapes through the outlets to produce rotation.

---

This invention relates to new and useful improvements in power plants, and the principal object of the invention is to provide a simple, highly efficient and economical power plant which is energized by a laser beam, that is to say, by high intensity pulses of coherent monochromatic light concentrated in an extremely narrow beam.

As has recently been discovered, the high energy level of a laser beam is capable of performing formidable physical work, as for example, in perforating metal, and the power plant of the present invention provides transducer means whereby the laser beam energy may be converted or transformed into a rotary motion which may then be utilized in any desired manner, as for example, driving electric generators, and the like.

In one embodiment of the invention the transducer includes a boiler for liquid, such as water for example, placed in the path of a laser beam so that the liquid is converted into pressurized vapor, such as steam for example. The transducer also includes a rotary member with propulsion jets through which the pressurized vapor from the boiler is discharged to produce rotation of the rotary member. In another embodiment the transducer consists of a rotary member equipped with propulsion vanes which are impelled by the laser beam so that rotation is produced by a direct physical force of the laser. In still another embodiment the rotary member of the transducer has pockets for gas, such as air for example, which is heated and expanded in the pockets by laser beam energy and escapes through jet-like outlets of the pockets for producing rotation.

With the foregoing object and features in view, the invention will be understood from the following description taken in conjunction with the accompanying drawings, wherein like characters of reference are used to designate like parts, and wherein:

FIGURE 4 is a vertical sectional view of a modified embodiment of the invention;

FIGURE 5 is a horizontal sectional view, taken substantially in the plane of the line 5—5 in FIG. 4;

FIGURE 6 is a fragmentary horizontal sectional view of another modified embodiment; and FIGURE 7 is an enlarged, fragmentary perspective view of one of the gas pockets used in the embodiment of FIG. 6.

Figure 1:
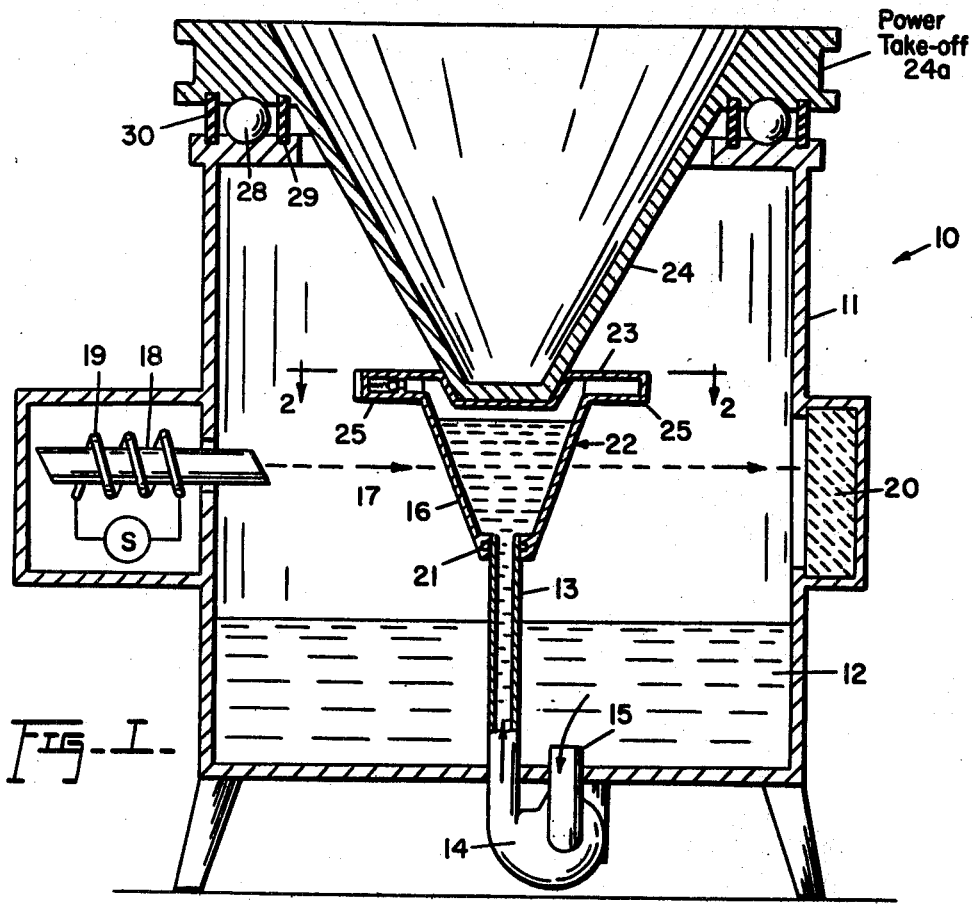
FIGURE 1 is a vertical sectional view showing one embodiment of the power plant of the invention.
Figure 3:
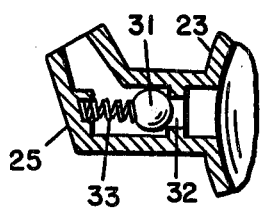
FIGURE 3 is an enlarged, fragmentary horizontal sectional detail of one of the propulsion jets.
Figure 2:
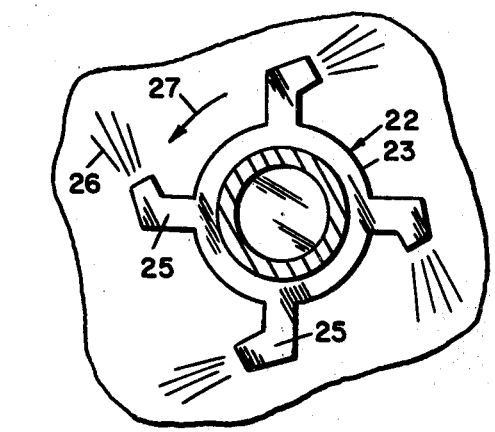
FIGURE 2 is a fragmentary horizontal sectional view, taken substantially in the plane of the line 2—2 in FIG. 1.

Referring now to the accompanying drawings in detail, more particularly to FIGS. 1–3 thereof, the laser energized power plant of the invention is designated generally by the reference numeral 10. The same comprises a suitable housing 11, the lower portion of which provides a reservoir for liquid, as for example water, indicated at 12. A standpipe 13 extends upwardly from the bottom of the housing, the lower end of the standpipe communicating with the outlet of a suitably driven water pump 14, drawing water from the reservoir 12 through an intake 15, as will be clearly apparent.

A substantially frusto-conical water boiler 16 is rotatably mounted at the upper end of the standpipe 13 and receives water pumped upwardly through the standpipe by the pump 14. The boiler 16 may be formed from transparent or light transmitting material such as heat-resistant glass for example, is positioned in the path of a laser beam 17 which is projected transversely of the housing 11 by a suitable laser beam generator 18. The latter is disposed at one side of the housing and is excited by a flash lamp 19 energized by a suitable source S. The side of the housing 11 opposite from the generator 18 is provided with a suitable backstop 20 for the laser beam. Water leakage at the rotatable connection of the boiler 16 and the standpipe 13 is prevented by suitable packing 21. When the laser generator 18 is energized, water in the boiler 16 will be caused to boil by energy of the laser beam 17, thus converting the water into steam while additional water is supplied to the boiler by the pump 14 at a rate coordinated with that of steam generation.

The boiler 16 constitutes a component of a transducer designated collectively by the numeral 22, which also includes a rotary member 23 and a combined steam condensing and power take-off element 24. The rotary member 23 may be formed integrally with the boiler 16 and is provided at its periphery with a plurality of propulsion jets 25, arranged substantially as shown so that steam generated in the boiler 16 may be discharged through the jets 25 as indicated at 26 in FIG. 2, for imparting rotary motion in the direction of the arrow 27 to the entire transducer 22.

The transducer element 24, which preferably is frusto-conical, is disposed in the upper portion of the housing 11 and is fused, adhered or otherwise suitably secured to the rotary member 23 for rotation therewith. The element 24 projects through the top of the housing 11 where it is rotatably supported, as for example by anti-friction bearings 28, and the portion of the element 24 above the housing may be in the form of a pulley, gear, or the like, to provide a rotary power take-off 24a. As will be noted, the element 24 is hollow with its interior open to the atmosphere to effect cooling, so that steam discharged by the jets 25 may be cooled and condensed by its contact with the element 24, the condensed steam returning as water into the water reservoir 12 for subsequent recirculation through the boiler 16. Escape of steam past the bearings 28 may be prevented by suitable packing rings 29, 30 at the inside and outside of the bearings, such packing rings also serving to retain lubricant around the bearings, if so desired.

It may be desirable to build up a certain steam pressure in the boiler 16 before discharging the steam through the jets 25, and for this purpose, as shown in FIG. 3, each of the jets 25 may be provided with a valve element 31 biased against a valve seat 32 by a spring 33, so that escape of steam through the jet is prevented until sufficient steam pressure is built up to overcome the action of the spring.

Reference is now drawn to a modified embodiment of the invention shown in FIGS. 4 and 5 and designated generally by the numeral 40. The same comprises a housing 41 equipped with the laser generator 18 and laser beam backstop 20, but the transducer in this instance does not involve conversion of water into steam or jet propulsion for producing rotary motion. Rather, the transducer comprises a simple rotary member 42 carried by a shaft 43 which is rotatably journalled in the housing 41 and projects outwardly therefrom to carry the power take-off element 24b. The member 42 has a plurality of radial arms 44 having enlarged outer end portions constituting propelling vanes 45 in the path of the laser beam 17, as will be apparent from FIG. 5. The laser beam exerts a direct physical force on the vanes 45, thus causing member 42 to rotate in the direction of the arrow 46.

Another modified embodiment of the invention, designated generally by the numeral 50, is shown in FIGS. 6 and 7. This is quite similar to the embodiment 40 but operates on a different principle. The shaft 43 in the housing 41 carries a member 51 rotatable with the shaft, the member 51 having a set of radial arms 52 each provided at its outer end with a substantially cylindrical air pocket forming component 53. The component 53 has a closed top and bottom but is open at one side to provide a jet-type outlet 54 between a pair of outwardly divergent side flanges 55, the outlet 54 of the pocket being open in the direction of the laser source 18, as shown in FIG. 6. The energy of the laser beam 17 heats and expands the air in the pocket 53 as each pocket comes into the path of the beam, and the expanding air escapes through the jet-like outlet 54 of the pocket as shown at 56, thus causing the member 51 to rotate in the direction of the arrow 46. The interior of the pocket forming members 53 is preferably reflective or reflectively coated to increase the heating effect of air by the laser beam.

While in the foregoing there have been described and shown the preferred embodiments of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. A laser energized power plant, comprising in combination a laser beam generator and a transducer positioned in the path of a laser beam emanating from said generator whereby to transform laser beam energy into rotary motion, said transducer including a boiler positioned in the laser beam path and containing liquid for conversion into pressurized vapor by laser beam energy, a rotary member having a plurality of propulsion jets communicating with said boiler and receiving pressurized vapor therefrom to impart rotation to said rotary member, a housing forming a liquid reservoir, said boiler being rotatable with said rotary member and rotatably mounted in said housing, said generator being disposed at one side of the housing to project a laser beam onto the boiler, and means for delivering liquid from said reservoir to the boiler.

2. The device as defined in claim 1 together with a laser beam backstop provided at a side of said housing opposite from said generator.

3. The device as defined in claim 1 together with a combined power take-off and vapor condensating element rotatably mounted in said housing above said rotary member and connected to the latter for rotation therewith, vapor discharged by said propulsion jets and condensed by said element being returned to said reservoir.

4. A laser energized power plant, comprising in combination a laser beam generator and a rotatable transducer positioned in the path of a laser beam emanating from said generator whereby to transform laser beam energy into rotary motion, said transducer comprising a rotary member having a plurality of gas pockets wherein gas is heated and expanded by laser beam energy, said pockets having jet-type gas outlets whereby heated and expanded gas escaping from said pockets may impart rotation to said member.

5. The device as defined in claim 4 together with a housing having said transducer rotatably mounted therein, said generator being mounted at one side of said housing to project a laser beam into said gas pockets of the transducer, and a laser beam backstop provided at a side of said housing opposite from said generator.

6. The device as defined in claim 4 wherein said gas pockets are provided at the inside thereof with a reflective coating.

References Cited

UNITED STATES PATENTS

| 63,148 | 3/1867 | Ely | 60—108 |
| 890,591 | 6/1908 | Andreas | 60—108 |
| 2,151,949 | 3/1939 | Turner | 60—108 X |
| 3,289,101 | 11/1966 | Masters et al. | 331—94.5 |
| 3,307,448 | 3/1967 | Stimler et al. | 331—94.5 X |

FOREIGN PATENTS 156,018    1/1921    Great Britain.

OTHER REFERENCES

Laser Beam Welding by Stephen MacNeille, found in Tool Manufacturing Engineer, June 1963, pp. 59–63, vol. 50.

CARROLL B. DORITY, JR., Primary Examiner

U.S. Cl. X.R.

60—1, 26; 331—94.5